Jan. 26, 1965   A. SALVETTI   3,167,154
SURFACE ENGAGING BRAKING SYSTEM
Filed Jan. 21, 1963   4 Sheets-Sheet 1

Inventor:
Adriano Salvetti
By Anderson Luedeka, Fitch, Even & Tabin Attys.

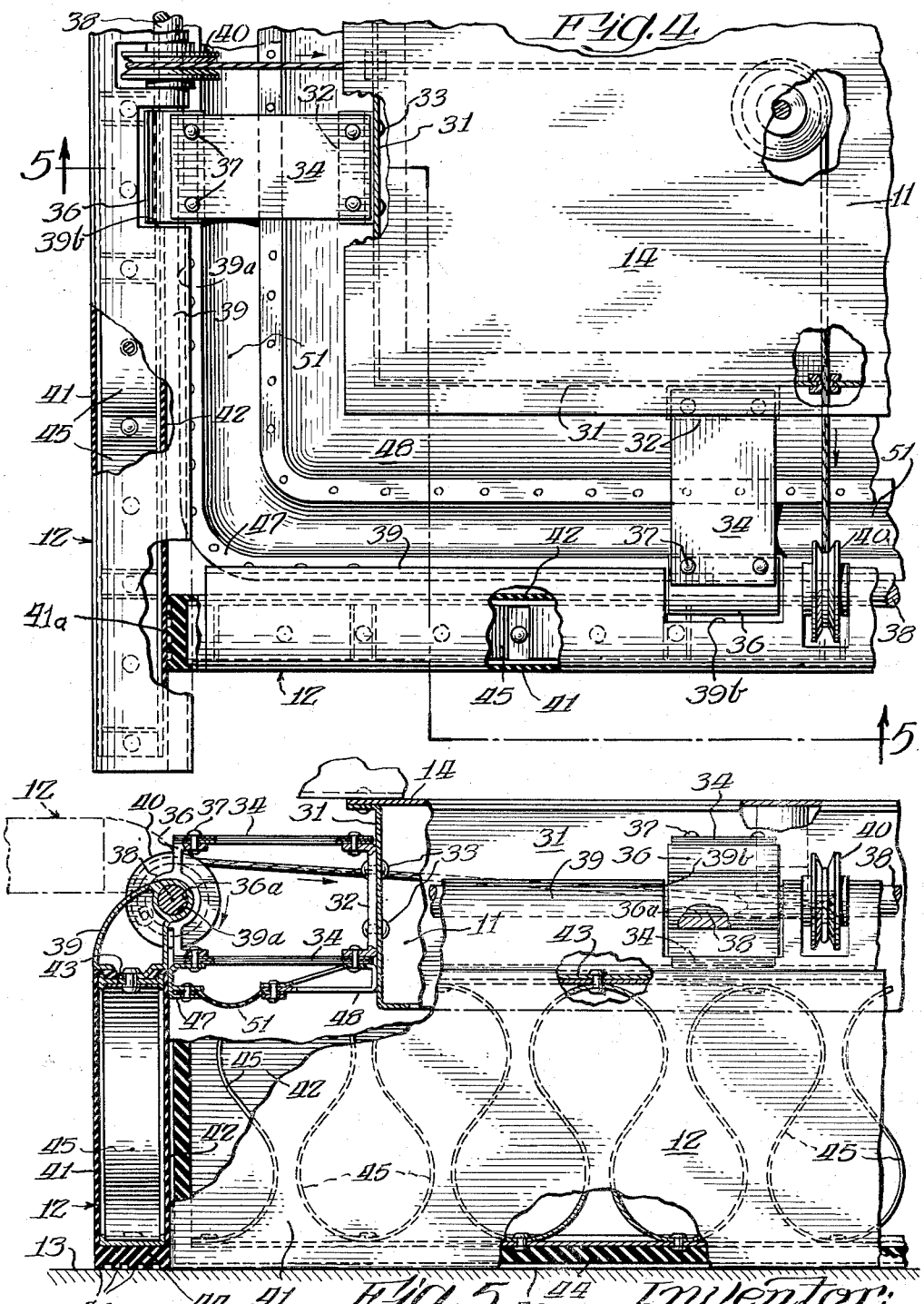

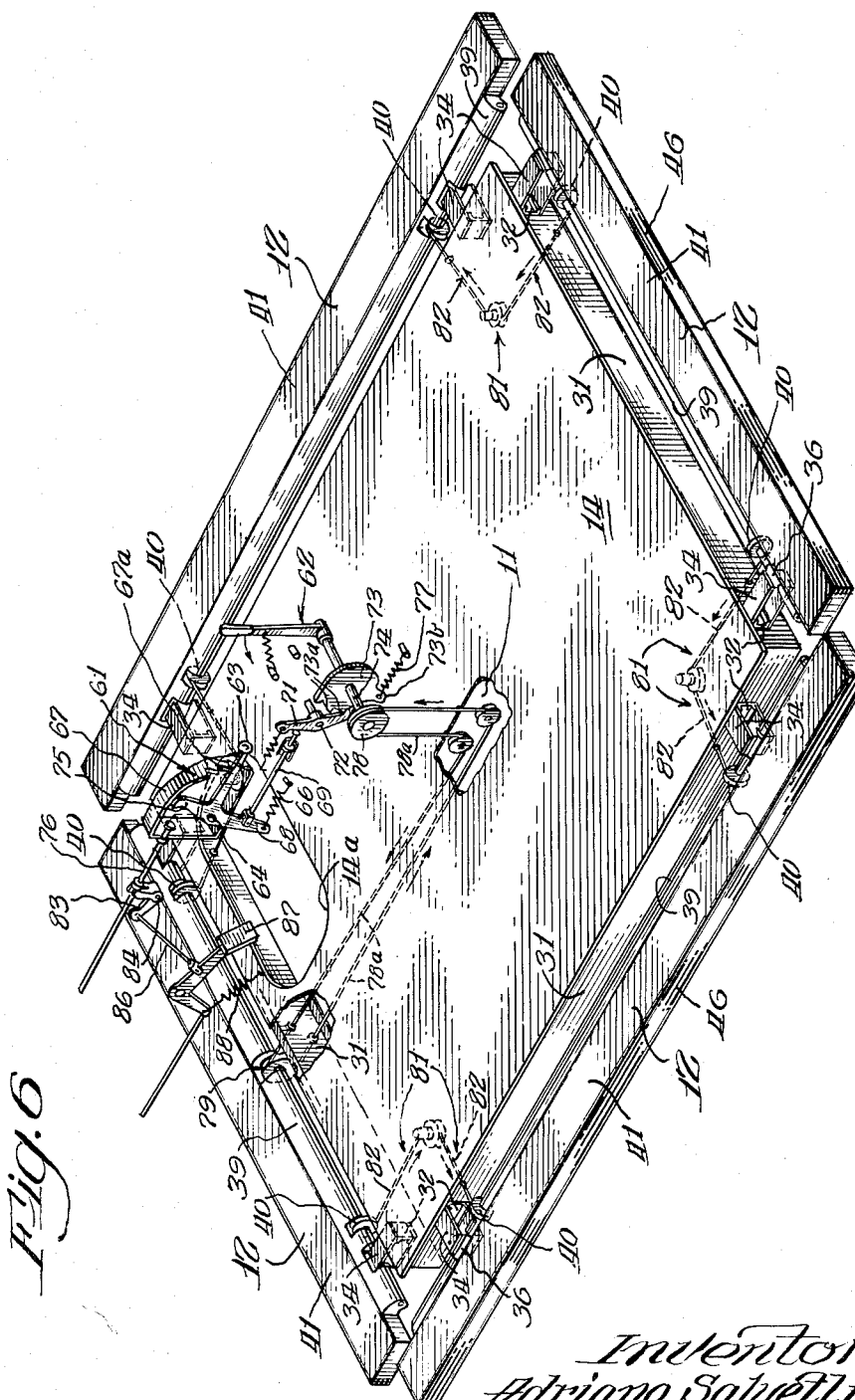

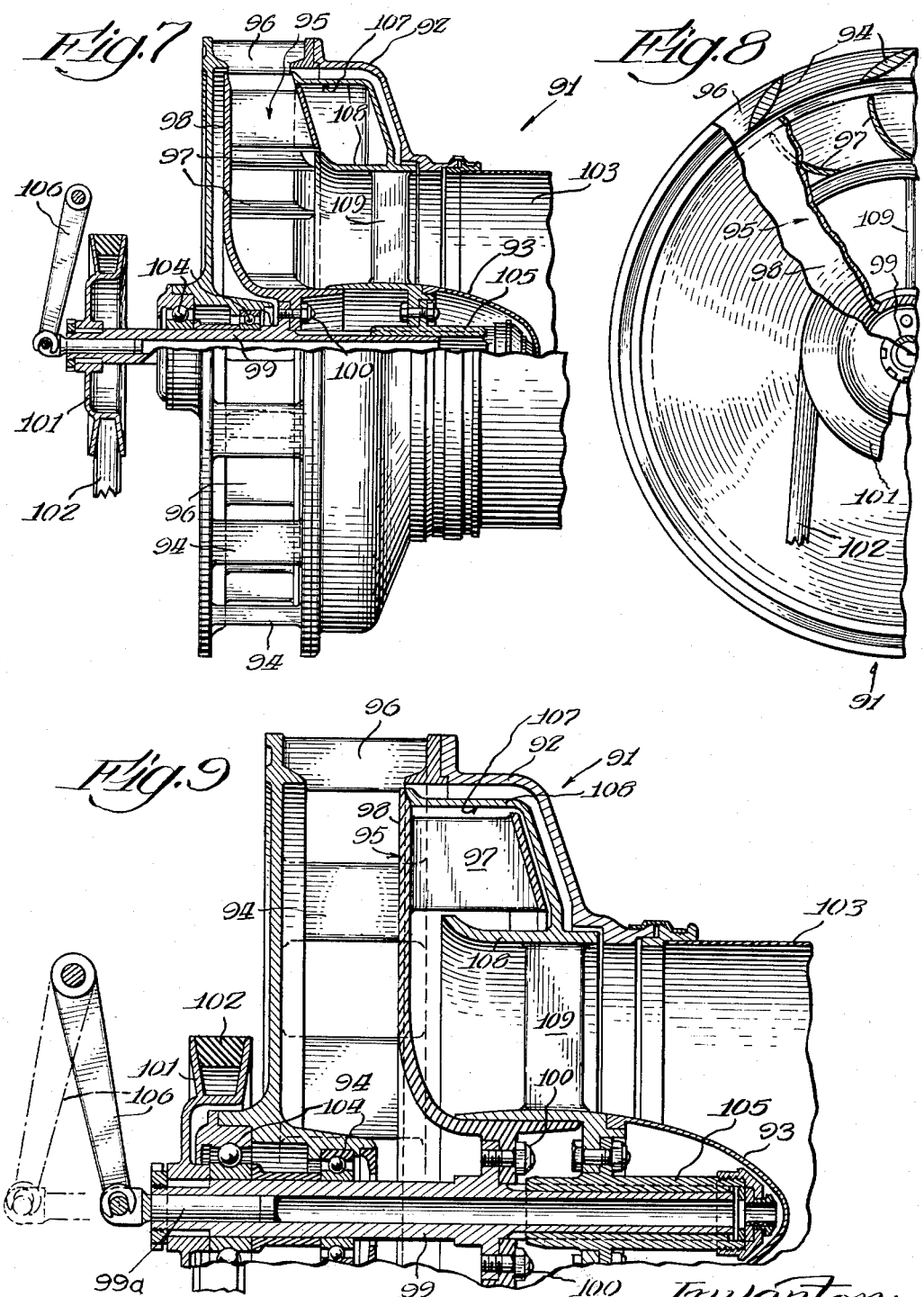

United States Patent Office 3,167,154
Patented Jan. 26, 1965

3,167,154
SURFACE ENGAGING BRAKING SYSTEM
Adriano Salvetti, Via Barozzi 2, Milan, Italy
Filed Jan. 21, 1963, Ser. No. 252,837
Claims priority, application Italy, Feb. 2, 1962,
20,201, Patent 663,013
7 Claims. (Cl. 188—5)

This invention relates to braking systems and more particularly to a vacuum braking system for vehicles whereby the vehicle may be bound to the ground or other supporting surface when in a stationary condition or brought to a rapid stop when in a travelling state.

Various vehicles such as automobiles, trucks and the like have been provided with numerous types of braking mechanisms. In general, the braking mechanisms incorporated in such vehicles have proven satisfactory for the purposes contemplated. However, such braking units have not been capable of fixedly binding the vehicle to the ground so as to preclude overturning when subjected to extremely high winds, of preventing overturning when travelling around curves at relatively high speeds or of insuring a rapid stop when travelling along a relatively slippery surface.

The prime object of the present invention is to provide an improved braking system.

A further object of the present invention is to provide a vacuum braking system which can be utilized in conjunction with automobiles, trucks and the like to effect the positive binding of the vehicle to the ground.

A further object of the present invention is to provide a vacuum braking system as outlined above which is inexpensive, efficient and readily adaptable for use in numerous types of vehicles.

Other objects and advantages of the present invention will become apparent from the following description thereof when considered in conjunction with the accompanying drawings wherein:

FIGURE 4 is an enlarged fragmentary plan view which illustrates various of the more detailed features of a preferred embodiment of the vacuum braking system of the present invention;

FIGURE 5 is a fragmentary cross sectional view taken along the line 5—5 in FIGURE 4;

FIGURE 6 is a simplified perspective view of the control instrumentalities for the vacuum braking system illustrated in FIGS. 1–5;

FIGURE 7 is a fragmentary side elevational view partially broken away which illustrates a modified form of suction creating device that can be utilized in the vacuum braking system of the present invention;

FIGURE 8 is a fragmentary front elevational view of the device illustrated in FIG. 7 with a portion partially broken away; and FIGURE 9 is an enlarged fragmentary cross sectional view of the device illustrated in FIGURES 7 and 8 when in an unactuated state.

In general, the present invention relates to a vacuum braking system which can be utilized with numerous types of vehicles to provide an efficient and safe auxiliary braking mechanism that is functional either when the vehicle is travelling or when in a stationary state. One preferred embodiment of the system includes apparatus for creating a suction force. This suction creating apparatus is connected to a collapsible chamber forming structure that is selectively actuated to form an enclosed chamber beneath the vehicle which communicates directly with the surface over which the vehicle is then travelling or upon which it is then resting. The formation of the enclosed chamber is effected in unison with the actuation of the suction apparatus so that a vacuum is produced within the enclosed chamber so as to cause the vehicle to become bound to the surface with which the lower portion of the chamber communicates.

Although the vacuum braking system of the present invention can be modified in various ways, which would be obvious to those skilled in the art, so that it can be utilized in conjunction with numerous vehicles such as automobiles, trucks and the like, the following detailed description will be premised on the use of one preferred embodiment in a conventional automobile generally designated by the numeral 10.

Figure 1:
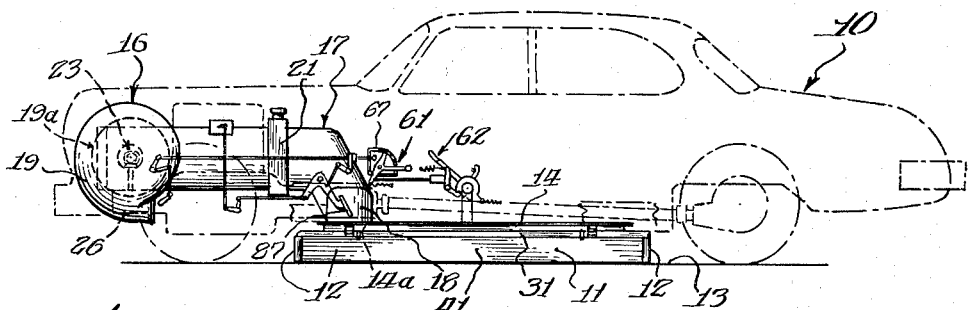
FIGURE 1 is a side elevational view of one preferred embodiment of the vacuum braking system of the present invention.
Figure 2:
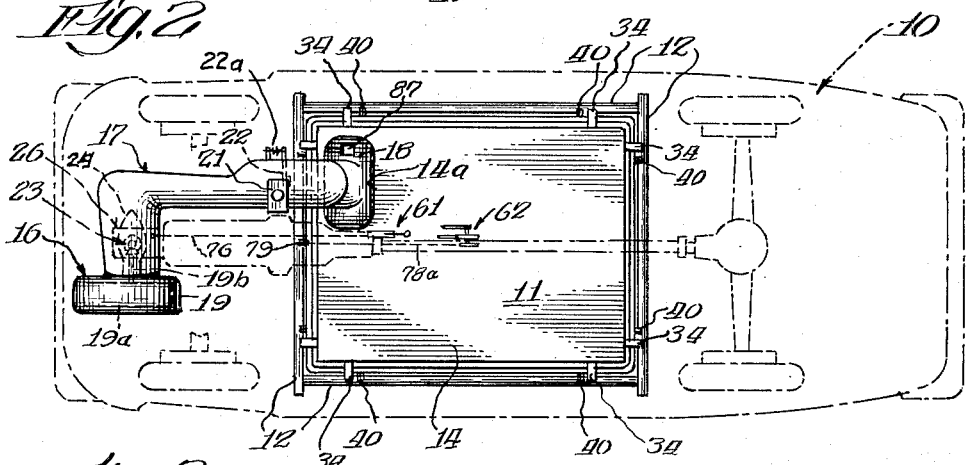
FIGURE 2 is a plan view of the system illustrated in FIGURE 1.
Figure 3:
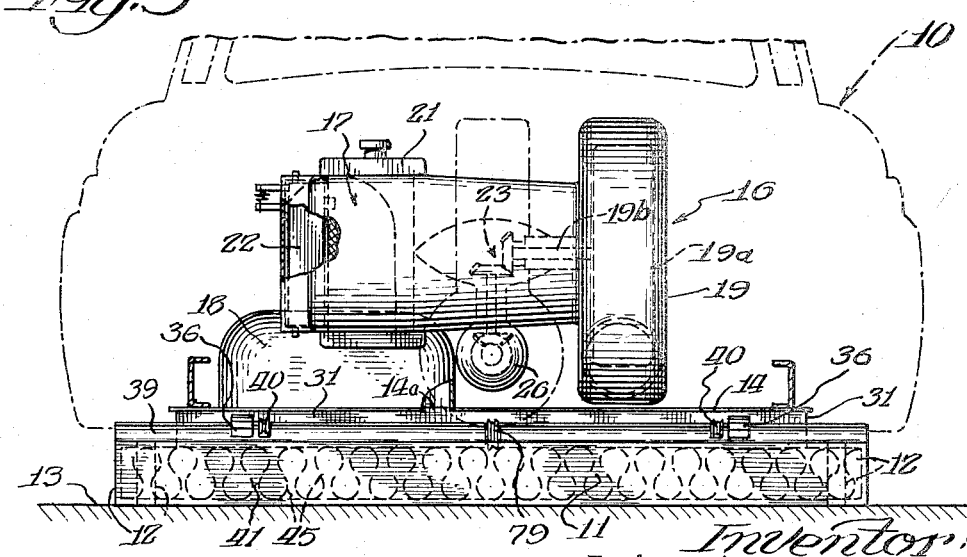
FIGURE 3 is an enlarged fragmentary front elevational view which illustrates additional features of the vacuum braking system of the present invention.

More particularly, the vacuum braking system is illustrated in FIGS. 1–3 in an actuated position so that a chamber 11 is formed having an open lower end which is shown in communication with a roadway surface 13 or the like. The sides of the chamber 11 are defined by a pair of longitudinally and a pair of laterally extending flexible wall members 12. As shown, the laterally extending wall members 12 adjacent the forward and rearward portions of the automobile 10 extend beyond and overlap the longitudinally extending side wall members so that the chamber 11 is essentially air tight.

An upper support member or baseboard 14 that is suitably secured to the automobile chassis has the flexible wall members 12 pivotally secured thereto, as hereinafter described, and is provided with a single aperture 14a adjacent the forward portion of the automobile. The aperture 14a communicates with a suction producing apparatus generally designated by the numeral 16. In this connection, a conduit member 17 provides a circulation path between a labyrinth type container and filtering means 18 that extends through the aperture 14a and into the chamber 11 and a centrifugal type suction creating apparatus or blower 19. The blower 19 is mounted on the automobile chassis and has the impeller 19a thereof suitably connected (as hereinafter described) to the internal combustion engine of the automobile. The automobile 10 is modified to the extent that the radiator 21 of the cooling system is positioned within the conduit member 17 adjacent a gate valve 22 that is normally biased to a closed position by a spring 22a.

The braking system is designed so that the centrifugal type blower 19 is driven at a low speed by the engine during the normal operation of the vehicle, and the circulation of air through the conduit member 17 effects the cooling of the engine. During this normal operation, the spring 22a maintains the gate valve in a closed position. However, when the vacuum braking system is actuated and the flexible wall members 12 are lowered (as later described in detail) to define the chamber 11, the blower 19 is driven at a substantially higher rate. When this occurs, the biasing force of the spring 22a is overcome and the gate valve 22 is pivoted to an open position to allow a vacuum to be created in the chamber 11 that causes the automobile to be bound to the surface 13.

As shown particularly in FIGURE 3, the impeller 19a of the centrifugal type blower 19 is linked through a connecting rod 19b to a conical gear-countershaft arrangement 23 that is confined within a housing 24. The gear arrangement 23 is connected through a conventional speed regulating mechanism (not shown) that is confined within a housing 26 to the driveshaft of the automobile engine. Preferably, the speed regulating device allows at least two speed operation of the blower 19 so that the desired cooling and braking action can be effected, as generally outlined above.

The construction of the flexible wall members 12 and the manner in which these members are actuated to define the chamber 11 will best be understood from a consideration of FIGURES 4-6. As shown, the upper baseboard or support member 14, which is fixedly secured to the chassis of the automobile 10, has a plurality of downwardly projecting mating support plates 31 secured thereto near the peripheral edges of this member. Each of the support plates 31 has at least a pair of U shaped connecting bars 32 secured thereto in preselected spaced relation by suitable fasteners 33. A pair of conventional leaf springs 34 is secured to and extend outwardly from each of the U shaped connecting bars 32 in spaced apart parallel relation to each other. An apertured support member 36 is secured by suitable fasteners 37 to the outer extremities of each pair of leaf springs 34 extending from a common support plate 31.

Each support member 36 is provided with a central aperture 36a wherein an elongated cylindrical shaft or pivot member 38 is rotatably positioned to provide a hinge-like connection. An elongated apertured linking element 39 that forms the upper extremity of each of the flexible wall members 12 is fixedly secured to the shaft 38. More particularly, the linking elements 39 are provided with suitably proportioned apertures 39a wherein the pivot members 38 are positioned. As shown, each of the linking elements 39 is formed with cut-away portions 39b to accommodate the support members 36 and a pair of pulleys 40 that are fixedly secured to the shaft 38. In this connection, any rotation imparted to the shafts 38 through the pulleys 40 results in the linking members 39 of the flexible wall members 12 being simultaneously pivoted.

Referring to FIG. 4, the main portion of the wall members 12 is an elongated hollow rectangular member formed by end walls 41a, side walls 41 and 42, an upper wall portion 43 that is secured to the linking member 39 and a lower base portion 44 that is provided with a plurality of elongated gripping grooves 46 as are the end walls. The wall members 12 are preferably fabricated of a strong but flexible material such as rubber, reinforced cloth or suitable synthetic material. In this connection, the wall members should be capable of deformation when a portion thereof comes in contact with some obstacle or uneven surface during operation of the vacuum braking system. To provide a desired amount of resiliency for the wall members 12, a spring member 45 formed of an elongated metallic strip is secured by suitable fasteners in an undulating configuration within the hollow main body portion of each that is defined by the walls 41a, 41, 42, 43 and 44.

A pair of members 47 and 48 that define the peripheral edge of the upper wall for the chamber 11 extend completely around the baseboard 14 and are secured beneath the leaf springs 34. The member 47 serves as a stopping element for the flexible wall members 12. In this connection, the member 47 is secured to and beneath the lowermost leaf springs 34 so that the wall members 12 are maintained in a substantially perpendicular position when the inner wall surfaces 42 thereof are pivoted into engagement with the member 47. Although the leaf springs 34 allow a limited amount of upward and downward pivoting of the entire support assembly for the flexible wall members 12, the member 48 that is secured to both the leaf springs and the support plates 31 precludes any substantial movement thereof that would be detrimental to the successful operation of the braking system. A flexible diaphragm member 51 is secured to the members 47 and 48 and extends across the aperture defined between these members. This diaphragm 51 precludes air from entering the chamber 11 when the vacuum braking system is in operation and readily accommodates the aforementioned limited upward and downward movement of the wall members.

The manner in which the vacuum braking system functions will best be understood from a consideration of FIGURE 6, which is a simplified perspective view of the control instrumentalities of the system. As shown, a brake actuating lever 61 and a resetting lever 62 are mounted within suitable housings in the automobile 10 so that they may be readily actuated by the driver thereof. In this connection, the actuating lever 61 includes a lever arm 63 that is pivoted about a point 64 and biased for rotation by a spring 66. The lever arm is normally maintained in contact with a first of a plurality of teeth 67a of a toothed housing 67 when the system is in an unactivated condition.

A downwardly extending portion 68 of the lever arm 63 is secured to a push-rod 69 that is maintained in abutting relationship with a spring biased, pivotally mounted engaging element 71. The engaging element 71 is pivoted on the support structure at a point 72 so as to engage one of a plurality of teeth 73a of a toothed wheel 73 that gradually increase in size. As shown, the toothed wheel 73 is mounted on a shaft 74 whereto the resetting lever 62 is also secured. An upwardly extending portion 75 of the lever arm 63 is designed to engage an actuating element 76 that is linked through suitable means (not shown) to the speed regulating device confined within the housing 26.

Accordingly, the manual advance of the lever arm 63 out of engagement with the first of the teeth 67a and into contact with the last of the teeth 67a causes the downwardly and upwardly extending portions 68 and 75 thereof to effect the simultaneous pivoting of the tooth engaging element 71 and the forward advance of the actuating element 76. As a result, the toothed wheel 73 is allowed to rotate in response to a biasing force imparted thereto by a spring 77 that is secured to an outwardly projecting portion 73b on the toothed wheel. The toothed wheel 73 rotates until one of the teeth thereof (e.g. the last of the teeth for full braking action) is again engaged by the element 71. A main control pulley 78 which is fixedly secured to the shaft 74 is thereby caused to rotate with the toothed wheel 73.

When the lever is advanced into engagement with the last of the teeth 67a for full braking action, the actuating element 76 is simultaneously advanced in a forward direction a sufficient distance to actuate the speed regulating device to maximum blower power and produce a strong vacuum within the chamber 11 defined by the wall members 12. In this connection, the main control pulley 78 has the ends of a cable 78a secured thereto so that rotation of the pulley in response to that of the toothed wheel 73 causes the concomitant advance of the cable segments over a secondary control pulley 79. The secondary control pulley is secured to the forwardmost shaft 38 between the two spaced apart pulleys 40 that are also fixedly secured thereto. The rotation imparted to the secondary control pulley 79 by the pulley 78 through the cable 78a causes the forward flexible wall member 12 to be advanced downwardly. The downward pivoting of this wall member 12 causes the simultaneous rotation of the pulleys 40 that are secured thereto thereby effecting the downward rotation of the remaining wall members 12 through the actuation of a conventional pulley-cable arrangement 81.

More particularly, the pulleys 40 of the other wall members 12 are connected to those secured to the forwardmost wall member 12 by cable segments 82 having suitable lengths to readily accommodate the substantially simultaneous pivoting of these members into an overlapping cavity-defining relationship. As a consequence, a substantially air tight chamber 11 is defined by the wall members beneath the automobile. It should be understood that the wall members 12 pivot under the influence of their own weight as well as in response to the action of the pulley-cable arrangement 81 and, if desired, can be spring biased so that the controlled pivoting action thereof is further enhanced.

As previously set forth, the actuating element 76 simultaneously actuates the speed regulating device to allow the blower 19 to be driven at a maximum rate when full braking action is desired. To facilitate this vacuum producing operation of the blower 19, a bell crank lever 83 is positioned on the automobile support structure so as be engaged by the forward advance of the actuating element 76. As shown, the bell crank 83 is pivoted about the point 84 and is suitably connected through a linking element 86 to the pivotally mounted accelerator pedal 87 of the automobile. Accordingly, as the speed regulating device is adjusted to yield maximum blower power, the accelerator is simultaneously pivoted downwardly against the action of a spring 88 to allow the motor to develop maximum driving torque for the blower 19. In this connection, the automobile 10 is placed in a neutral driving state prior to engaging the vacuum braking system and this can be effected through a linkage connected to the lever 63 if desired.

After the automobile has been brought to the desired stop and subsequent to the time that the operation of the vacuum braking system is completed, the system is restored to an initial unactuated condition by the repositioning of the levers 62 and 63. More particularly, the levers 62 and 63 are pivoted in a direction to allow the actuating element 76, toothed wheel 73 and accelerator pedal to be repositioned. The elements described above cooperate with the multitoothed arrangements both on the housing 67 and on the wheel 73 to also allow the system to be operated at an intermediate position when a gradual braking force is desired with the vehicle travelling at slower speeds.

FIGURES 7–9 illustrate another embodiment of a suction apparatus that can be utilized with the vacuum braking system of the present invention. Should the vacuum braking system employ this alternate type of suction apparatus in place of the blower 19, it is unnecessary to provide the speed regulating device as previously described. More particularly, the suction apparatus is a selectively operable, centrifugal type blower generally designated by the numeral 91 that produces a suction force for the chamber 11 only when in an actuated state. The blower 91 includes a generally cylindrical external housing 92. The housing 92 serves as a confining enclosure for a central supporting hub 93 that is mounted in concentric relation within the housing. In addition, the housing 92 confines a rotor blade section 95 and has a louvered peripheral exhaust opening 96 extending around the enlarged end thereof which is spanned by a plurality of connecting members 94 for those portions of the housing that define the exhaust opening.

As shown, the rotor blade section 95 includes a plurality of blades 97 that are mounted on and extend outwardly from a cylindrical support plate 98 adjacent the edge portion thereof. The support plate 98 is secured to a shaft 99 by suitable fasteners 100. The shaft 99, which is mounted both for rotation and axial movement within the hub 93, is connected to a pulley 101 that is driven in a conventional manner by a belt 102. The controlled advance of the belt 102 is effected by a pulley mounted on the drive shaft of the motor of the automobile.

The blower 91 is shown in FIGURE 7 in an actuated position with the rotor blade section 95 situated adjacent the louvered exhaust opening 96. Accordingly, when rotary motion is imparted to the pulley 101, the rotor blade section 95 is rotated within the housing 92 to effect the withdrawal of air from the chamber 11 through a pumping duct 103 of conventional design that connects the inlet of the blower to the chamber. To facilitate the desired rotation of the rotor blade section 95, the shaft 99 is rotatably mounted on suitable bearing members 104 that are secured in the forwardmost portion of the housing about the central axis thereof. The inner extremity of the shaft is positioned for free rotation with an apertured support chamber 105 that is mounted within the hub 93.

The outer extremity of the shaft 99 is connected through a linking element 99a to a pivotally mounted lever or actuating member 106 so that the shaft and the entire rotor blade section 95 that is secured thereto can be advanced along the central axis of the housing to the position shown in FIGURE 9 by the pivotal movement of the lever. In this connection, the linking element 99a is positioned within a central aperture provided in the shaft 99 so that the shaft is freely rotatable relative to the linking element.

When the lever has been pivoted to the location shown in FIGURE 9, the rotor blade section 95 is confined with an auxiliary chamber section 107 that is provided within the housing 92 by a pair of concentric wall members 108 that extend from supporting brackets 109. As shown, the supporting brackets 109 extend radially outwardly from the hub 93 so that the chamber section 107 is aligned with the rotor blade section 95.

When the rotor blade section 95 is positioned within the chamber 107 and out of communication with the exhaust opening 96 rotation imparted to the rotor blade section does not create any suction force in the chamber 11 and the support plate 98 obstructs the passage between the pumping duct 103 and the peripheral exhaust opening 96. As a consequence, the rotor blade section in this location acts substantially as a flywheel and does not absorb any substantial amount of blower power. Accordingly, by the actuation of the lever 106 the blower can be positioned within the housing 92 in communication with the exhaust opening and thereby create the necessary vacuum within the chamber 11 or can be positioned within the auxiliary chamber 107 and not create any suction force during its rotation. The actuation of the lever 106 is preferably controlled by the instrumentalities previously described (i.e. by the actuation of the lever 63) through a conventional linkage arrangement.

The foregoing description of the vacuum braking system of the present invention is merely illustrative of one preferred embodiment thereof. It should be understood that modifications in the structural components of the system can be effected without departing from the invention, various features of which are set forth in the accompanying claims.

What is claimed is:

1. A vacuum braking system for a vehicle which comprises a suction producing apparatus mounted on the vehicle, a plurality of hollow flexible wall members secured to the underside of the vehicle for selective pivotal movement into and out of chamber forming communication with the surface beneath the vehicle, a leaf spring contained within each of said hollow wall members and extending generally parallel to the surface-engaging edge thereof, ducting means connecting said suction producing apparatus in communication with the chamber when formed by said wall members whereby a vacuum is created in the chamber upon the actuation of said suction producing apparatus, and means connected to said suction producing apparatus and said flexible wall members to effect the pivoting of said wall members into chamber forming communication with the surface beneath the vehicle and the simultaneous actuation of said suction producing apparatus.

2. A vacuum braking system for a vehicle which comprises a suction producing apparatus mounted on the vehicle, a substantial rectangular support plate secured to the underside of the vehicle, said support plate having an aperture provided therein; ducting means connecting said suction producing apparatus in communication with the aperture provided in said support plate, a plurality of hollow side wall members, one each of said side wall members being secured to each of the sides of said support plate for pivotal movement relative thereto from a normal position above the surface beneath the vehicle to an actuated position in communication with the surface beneath the vehicle so that a chamber is formed thereby, each of said wall members having disposed therein a resilient metal strip formed into an undulating configuration and extending in generally parallel relation to the surface-engaging edge thereof, and means connected to said suction producing apparatus and said side wall members for effecting the actuation of said suction producing apparatus and the concomitant pivoting of said side wall members into chamber forming communication with the surface beneath the vehicle.

3. A vehicle comprising a body including a frame adapted for movement along a supporting surface, suction-producing means mounted on said frame, selectively actuable means mounted on said frame for forming a braking chamber in communication with the surface beneath the frame, a conduit connecting said suction-producing means with said chamber, a motor mounted on said frame adapted for driving movement of said suction-producing means, and a cooling system for said vehicle including an air cooled radiator mounted on said frame, said radiator being at least partially disposed within said conduit so as to be cooled by the air passing therethrough.

4. A vehicle comprising a body including a frame adapted for movement along a supporting surface, suction-producing means mounted on said frame and adapted to be operated at a first rate, selectively actuable means mounted on said frame for forming a braking chamber in communication with the surface beneath the frame, a conduit connecting said suction-producing means with said braking chamber, a motor mounted on said frame adapted for driving movement of said suction-producing means, a cooling system for said vehicle including an air cooled radiator mounted on said frame, said radiator being at least partially disposed within said conduit so as to be cooled by the air passing therethrough when said suction-producing means is operated at said first rate, and selectively operable means for actuating said chamber-forming means and for simultaneously causing said motor to drive said suction-producing means at a second rate greater than said first rate to cause braking of the vehicle.

5. A vehicle comprising a body including a frame adapted for movement along a supporting surface, suction-producing means mounted on said frame and adapted to be operated at a first rate, selectively actuable means mounted on said frame for forming a braking chamber in communication with the surface beneath the frame, a conduit connecting said suction-producing means with said chamber-forming means, a cooling system for said vehicle including an air cooled radiator mounted on said frame, said radiator being at least partially disposed within said conduit, a gate valve disposed within said conduit adjacent the radiator for blocking the unobstructed portion of said conduit adjacent said radiator, said gate valve being normally biased to a conduit-closing position, a motor mounted on said frame adapted for driving movement of said suction-producing means, and selectively operable means for actuating said chamber-forming means and for simultaneously causing said gate valve to be moved to a non-obstructing position within said conduit and for causing said motor to drive said suction-producing means at a second rate greater than said first rate to cause braking of the vehicle.

6. A vehicle comprising a body including a frame adapted for movement along a supporting surface, a suction-producing means mounted on said frame and including a housing and a blade section mounted within said housing for rotation about a given axis, said blade section being movable along said axis between a first position in which said means produces no appreciable amount of suction and a second position in which an appreciable amount of suction is produced, means maintaining said blade section in said first position during the normal operation of said vehicle, selectively actuable means mounted on said frame for forming a braking chamber in communication with the surface beneath the vehicle, a conduit connecting said suction-producing means with said chamber-forming means, a motor mounted on said frame and connected to said suction-producing means for driving the same, and means for selectively actuating said chamber-forming means and for simultaneously moving said blade section of said suction-producing means from said first position to said second position so as to cause a suction to be produced thereby.

7. A vehicle comprising a body including a frame adapted for movement along a supporting surface, suction-producing means mounted on said frame, said suction-producing means being adapted to produce a first rate of suction during non-braking movement of said vehicle, a plurality of hollow flexible wall members secured to the underside of the vehicle for selective pivotal movement into and out of chamber-forming communication with the surface beneath the vehicle, a leaf spring contained within each of said hollow wall members and extending generally parallel to the surface-engaging edge thereof, a conduit connecting said suction-producing means with said chamber-forming means, a motor mounted on said frame adapted for driving movement of said suction-producing means, a cooling system for said vehicle including an air cooled radiator mounted on said frame, said radiator being at least partially disposed within said conduit so as to be cooled by the air passing therethrough when said suction-producing means are operated at said first rate of suction, a gate valve disposed within said conduit adjacent said radiator for blocking the unobstructed portion of said conduit adjacent said radiator, said gate valve being normally biased to a conduit-obstructing position, and selectively operable means for actuating said chamber-forming means and for simultaneously causing said gate valve to be moved to a non-obstructing position within said conduit and for causing said suction-producing means at a second rate of suction greater than said first rate of suction to cause braking of the vehicle.

References Cited by the Examiner
UNITED STATES PATENTS
1,698,482  1/29  Nicin.

FOREIGN PATENTS
23,640  19/06  Great Britain.
387,820  2/33  Great Britain.
1,159,866  2/58  France.

ARTHUR L. LA POINT, *Primary Examiner.*
EUGENE G. BOTZ, *Examiner.*